(12) United States Patent
Kim et al.

(10) Patent No.: US 9,927,555 B2
(45) Date of Patent: Mar. 27, 2018

(54) COMPOSITION FOR POLARIZING FILM, POLARIZING FILM, AND DISPLAY DEVICE

(71) Applicants: Ha Na Kim, Yongin-si (KR); Deuk Kyu Moon, Seoul (KR); Yong Joo Lee, Suwon-si (KR); Boreum Jeong, Daejeon (KR); Myung Sup Jung, Seongnam-si (KR)

(72) Inventors: Ha Na Kim, Yongin-si (KR); Deuk Kyu Moon, Seoul (KR); Yong Joo Lee, Suwon-si (KR); Boreum Jeong, Daejeon (KR); Myung Sup Jung, Seongnam-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 292 days.

(21) Appl. No.: 14/681,682

(22) Filed: Apr. 8, 2015

(65) Prior Publication Data

US 2016/0187538 A1 Jun. 30, 2016

(30) Foreign Application Priority Data

Dec. 26, 2014 (KR) .................. 10-2014-0190804

(51) Int. Cl.
*G02B 5/30* (2006.01)
*G02F 1/1335* (2006.01)
*G02B 1/08* (2006.01)

(52) U.S. Cl.
CPC ............. *G02B 1/08* (2013.01); *G02B 5/3033* (2013.01); *G02F 1/133533* (2013.01); *Y10T 428/1041* (2015.01)

(58) Field of Classification Search
CPC ........ G02B 1/08; G02B 5/223; G02B 5/3033; G02F 1/133533; Y10T 428/1041
See application file for complete search history.

(56) References Cited

U.S. PATENT DOCUMENTS 7,811,642 B2 10/2010 Peglow et al.
8,053,039 B2 11/2011 Peglow et al.
(Continued)

FOREIGN PATENT DOCUMENTS

JP 08302219 B1 11/1996
JP 2002169020 A 6/2002
(Continued)

OTHER PUBLICATIONS

Color, Wikipedia, Mar. 15, 2017.*
(Continued)

*Primary Examiner* — Sophie Hon
(74) *Attorney, Agent, or Firm* — Cantor Colburn LLP

(57) ABSTRACT

A composition for a polarizing film including a polymer and at least one of dichroic dye, wherein the dichroic dye includes a first dichroic dye represented by Chemical Formula 1 and having a molecular weight of greater than or equal to about 500 Daltons:

Chemical Formula 1

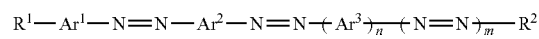

wherein in Chemical Formula 1, $Ar^1$ to $Ar^3$, $R^1$, $R^2$, n, and m are the same as described in the detailed description.

14 Claims, 3 Drawing Sheets

(56) References Cited

U.S. PATENT DOCUMENTS

| | | | |
|---|---|---|---|
| 2001/0008109 A1* | 7/2001 | Banning | C07C 253/30 |
| | | | 106/31.75 |
| 2006/0188663 A1 | 8/2006 | Peglow et al. | |
| 2008/0001120 A1 | 1/2008 | Peglow et al. | |
| 2012/0050652 A1 | 3/2012 | Chang et al. | |
| 2012/0263767 A1* | 10/2012 | Oudry | A61Q 1/06 |
| | | | 424/401 |
| 2013/0092874 A1* | 4/2013 | Bacher | C09B 31/043 |
| | | | 252/299.1 |
| 2013/0303677 A1* | 11/2013 | Kim | G02B 5/3016 |
| | | | 524/508 |
| 2014/0124714 A1 | 5/2014 | Lee et al. | |
| 2014/0126053 A1 | 5/2014 | Won et al. | |
| 2014/0131643 A1 | 5/2014 | Lee et al. | |

FOREIGN PATENT DOCUMENTS

| | | |
|---|---|---|
| KR | 1020120021184 A | 3/2012 |
| KR | 1020120124903 A | 11/2012 |
| KR | 10-2013-0038514 A | 4/2013 |
| KR | 1020140058386 A | 5/2014 |
| KR | 1020140059145 A | 5/2014 |

OTHER PUBLICATIONS

Color Spaces, Konica Minolta Sensing Americas, Inc., pp. 1-8, 2017 [online], [retrieved on Oct. 27, 2017],Retrieved from the Internet <URL: https://sensing.konicaminolta.us/learning-center/color-measurement/color-spaces/>.*

* cited by examiner

COMPOSITION FOR POLARIZING FILM, POLARIZING FILM, AND DISPLAY DEVICE

CROSS-REFERENCE TO RELATED APPLICATION

This application claims priority to Korean Patent Application No. 10-2014-0190804 filed in the Korean Intellectual Property Office on Dec. 26, 2014, and all the benefits accruing therefrom under 35 U.S.C. § 119, the content of which is incorporated herein in its entirety by reference.

BACKGROUND

1. Field

A composition for a polarizing film, a polarizing film, and a display device are disclosed.

2. Description of the Related Art

A display device such as a liquid crystal display (LCD) and an organic light emitting diode (OLED) device include a polarizing plate attached to the outside of a display panel. The polarizing plate transmits light of a specific direction only and absorbs or reflects any other light. Thus, the polarizing plate may control the direction of incident light in the display panel or light emitted from the display panel.

The polarizing plate generally includes a polarizer and a protective layer for the polarizer. The polarizer may include, for example, iodine or a dichroic dye adsorbed and arranged on polyvinyl alcohol (PVA), and the protective layer may use, for example, triacetyl cellulose (TAC).

However, the process of production of the polarizing plate including the polarizer and the protective layer is complicated and costly and high production costs. In addition, the manufacture of a thick polarizing plate leads to an increased thickness of a display device.

Accordingly, a polarizing film that does not require a protective layer has been researched. The polarizing film may include a polymer and at least one dichroic dye.

However, the dichroic dye of a polarizing film may be easily diffused into adjacent layer contacting the polarizing film at a high temperature, thereby deteriorating the optical properties of the polarizing film due to loss of a dichroic dye in the polarizing film.

Thus, there remains a need in a polarizing film capable of maintaining desired optical properties in a wide temperature range.

SUMMARY

An embodiment provides a composition for a polarizing film capable of maintaining its optical properties by decreasing migration of a dichroic dye.

Another embodiment provides a polarizing film capable of maintaining its optical properties by decreasing migration of a dichroic dye.

Yet another embodiment provides a display device including the polarizing film.

According to an embodiment, a composition for a polarizing film includes:
a polymer and
at least one dichroic dye,
wherein the dichroic dye includes a first dichroic dye represented by Chemical Formula 1 and having a molecular weight of greater than or equal to about 500 Daltons.

Chemical Formula 1

In Chemical Formula 1,
$Ar^1$ to $Ar^3$ are each independently a substituted or unsubstituted C6 to C15 arylene group,
$R^1$ is a substituted or unsubstituted C1 to C20 alkyl group, a substituted or unsubstituted C1 to C20 alkoxy group, a substituted or unsubstituted C1 to C20 alkylthio group, or a combination thereof,
$R^2$ is hydrogen, a substituted or unsubstituted C1 to C20 alkyl group, a substituted or unsubstituted C6 to C20 aryl group, a C1 to C20 alkoxy group, a substituted or unsubstituted C1 to C20 alkylthio group, —$NR^3R^4$, or a combination thereof, wherein $R^3$ and $R^4$ are each independently hydrogen or a substituted or unsubstituted C1 to C10 alkyl group, and wherein $R^3$ and $R^4$ are optionally linked to each other to form a ring, and
n and m are independently 0 or 1.

$R^1$ in Chemical Formula 1 may be a substituted or unsubstituted C4 to C20 alkyl group or a substituted or unsubstituted C4 to C20 alkoxy group, and
$R^2$ in Chemical Formula 1 may be hydrogen, a substituted or unsubstituted C1 to C20 alkyl group, —$NR^3R^4$, or a combination thereof,
wherein $R^3$ and $R^4$ are each independently hydrogen or a substituted or unsubstituted C1 to C10 alkyl group, and wherein $R^3$ and $R^4$ are optionally linked to each other to form a ring.

The first dichroic dye may have a molecular weight of about 600 Daltons to about 1,000 Daltons.

The first dichroic dye may have a maximum absorption wavelength ($\lambda_{max}$ of about 380 nanometers to about 490 nanometers.

The dichroic dye may further include a second dichroic dye having a maximum absorption wavelength $\lambda_{max}$ of greater than about 490 nanometers and less than or equal to about 580 nanometers, a third dichroic dye having a maximum absorption wavelength $\lambda_{max}$ of greater than about 580 nanometers and less than or equal to about 780 nanometers, or a combination thereof.

A solubility parameter difference between the polymer and the dichroic dye may be less than about 7.2.

The polymer may include a polyolefin, a polyamide, a polyester, a polyacrylate, a polystyrene, a copolymer thereof, or a combination thereof.

The polymer may include polyethylene, polypropylene, polyethylene terephthalate, polyethylene terephthalate glycol, polyethylene naphthalate, nylon, a copolymer thereof, or a combination thereof.

An amount of the dichroic dye may be about 0.01 to 5 parts by weight based on 100 parts by weight of the polymer.

According to another embodiment, a polarizing film includes:
a polymer and
at least one dichroic dye,
wherein the dichroic dye includes a first dichroic dye represented by Chemical Formula 1 and having a molecular weight of greater than or equal to about 500 Daltons.

The first dichroic dye may have a molecular weight of about 600 Daltons to about 1,000 Daltons.

The first dichroic dye may have a maximum absorption wavelength $\lambda_{max}$ of about 380 nanometers to about 490 nanometers.

The dichroic dye may further include a second dichroic dye having a maximum absorption wavelength $\lambda_{max}$ of greater than about 490 nanometers and less than or equal to about 580 nanometers, and a third dichroic dye having a maximum absorption wavelength $\lambda_{max}$ of greater than about 580 nanometers and less than or equal to about 780 nanometers.

A solubility parameter difference between the polymer and the dichroic dye may be less than about 7.2.

The polymer may include a polyolefin, a polyamide, a polyester, a polyacrylate, a polystyrene, a copolymer thereof, or a combination thereof.

The polymer may include polyethylene, polypropylene, polyethylene terephthalate, polyethylene terephthalate glycol, polyethylene naphthalate, nylon, a copolymer thereof, or a combination thereof.

The polarizing film may be a melt-blend of the polymer and the dichroic dye, and an amount of the dichroic dye may be about 0.01 to 5 parts by weight based on 100 parts by weight of the polymer.

According to another embodiment, a display device includes:

a display panel and the polarizing film disposed on at least one side of the display panel.

The display panel may be a liquid crystal panel or an organic light emitting panel.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
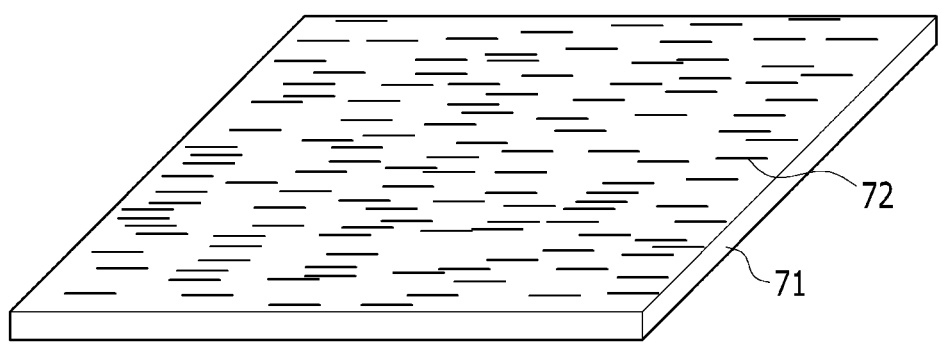
FIG. 1 is schematic view showing a polarizing film according to an embodiment.

Exemplary embodiments will hereinafter be described in detail, and may be easily performed by those who have common knowledge in the related art. However, this disclosure may be embodied in many different forms and should not be construed as limited to the exemplary embodiments set forth herein. Accordingly, the embodiments are merely described below, by referring to the figures, to explain aspects of the present description. As used herein, the term "and/or" includes any and all combinations of one or more of the associated listed items. The term "or" means "and/or." Expressions such as "at least one of" when preceding a list of elements, modify the entire list of elements and do not modify the individual elements of the list.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a definition is not otherwise provided, the term "substituted" refers to a group substituted with at least one substituent selected from a halogen atom (F, Br, Cl, or I), a hydroxyl group, a C1 to C20 alkoxy group, a cyano group, an amino group, a C1 to C20 ester group, a C1 to C20 alkyl group, a C6 to C30 aryl group, a C2 to C20 alkenyl group, a C2 to C20 alkynyl group, and a combination thereof, instead of hydrogen.

As used herein, when a definition is not otherwise provided, the term "alkyl" indicates a group derived from a completely saturated, branched or unbranched (or a straight or linear) hydrocarbon and having a specified number of carbon atoms.

As used herein, when a definition is not otherwise provided, the term "alkoxy" represents "alkyl-O—", wherein the term "alkyl" has the same meaning as described above.

As used herein, when a definition is not otherwise provided, the term "alkylthio" represents "alkyl-S—", wherein the term "alkyl" has the same meaning as described above.

Hereinafter, a composition for a polarizing film according to an embodiment is described.

A composition for a polarizing film according to an embodiment includes a polymer and a dichroic dye.

The polymer may be melted at a predetermined temperature or at a temperature greater than the predetermined temperature to provide a light-transmitting film, and may be, for example, a polymer having a melting point of greater than or equal to 80° C. and light transmittance of greater than or equal to about 80% in a visible ray region.

The polymer may be a hydrophobic polymer, for example a polyolefin, a polyamide, a polyester, a polyacrylate, a polystyrene, a copolymer thereof, or a combination thereof. The polymer may be, for example polyethylene (PE), polypropylene (PP), polyethylene terephthalate (PET), polyethylene terephthalate glycol (PETG), polyethylene naphthalate (PEN), nylon, a copolymer thereof, or a combination thereof, but is not limited thereto.

For example, the polymer may be a combination (mixture) of two or more selected from polyethylene (PE), polypropylene (PP), and a copolymer of polyethylene and polypropylene (PE-PP). For example, the polymer may be a combination (mixture) of polypropylene (PP) and a polyethylene-polypropylene copolymer (PE-PP).

The polypropylene (PP) may have, for example, a melt flow index (MFI) of about 0.1 grams per 10 minutes (g/10 min) to about 5 g/10 min. Herein, the melt flow index (MFI) shows the amount of a polymer in a melt state flowing per 10 minutes, and is related to viscosity of the polymer in a melted state. In other words, the lower the melt flow index (MFI) is, the higher is the polymer's viscosity. On the other hand, the higher the melt flow index (MFI) is, the lower is the polymer's viscosity. When the polypropylene (PP) has a melt flow index (MFI) within the above range, the properties of a final product and its workability may be effectively improved. For example, the polypropylene (PP) may have a melt flow index (MFI) ranging from about 0.5 g/10 min to about 5 g/10 min.

The polyethylene-polypropylene copolymer (PE-PP) may include about 1 percent by weight (wt %) to about 50 wt % of an ethylene group based on the total amount of the copolymer. When the polyethylene-polypropylene copolymer (PE-PP) includes the ethylene group within the above range, phase separation of the polypropylene and the polyethylene-polypropylene copolymer (PE-PP) may be effectively prevented or suppressed. In addition, the polyethylene-polypropylene copolymer (PE-PP) may have improved elongation rate, excellent light transmittance and alignment, and improved polarization characteristics. For example, the polyethylene-polypropylene copolymer (PE-PP) may include an ethylene group in an amount of about 1 wt % to about 25 wt % based on the total amount of the copolymer.

The polyethylene-polypropylene copolymer (PE-PP) may have a melt flow index (MFI) ranging from about 5 g/10 min to about 15 g/10 min. When the polyethylene-polypropylene copolymer (PE-PP) has a melt flow index (MFI) within the above range, the properties of a final product and its workability may be effectively improved. For example, the polyethylene-polypropylene copolymer (PE-PP) may have a melt flow index (MFI) ranging from about 10 g/10 min to about 15 g/10 min.

When the polymer is a mixture of the polypropylene (PP) and the polyethylene-polypropylene copolymer (PE-PP), the polypropylene (PP) and the polyethylene-polypropylene copolymer (PE-PP) may be included in a weight ratio of about 1:9 to about 9:1. When the polypropylene (PP) and the polyethylene-polypropylene copolymer (PE-PP) are included within the above range, the crystallization of polypropylene may be prevented and the polypropylene may have excellent mechanical strength, and effectively improved haze characteristic. For example, the polypropylene (PP) and the polyethylene-polypropylene copolymer (PE-PP) may be included in a weight ratio of about 4:6 to about 6:4, for example about 5:5.

The polymer may have a melt flow index (MFI) ranging from about 1 g/10 min to about 15 g/10 min. When the polymer has a melt flow index (MFI) within the above range, crystals are not excessively formed in the polymer, and the polyolefin may not only secure excellent light transmittance, but may also have appropriate viscosity for manufacturing a film and thus improved workability. For example, the polymer may have a melt flow index (MFI) ranging from about 5 g/10 min to about 15 g/10 min.

The polymer may have haze ranging from less than or equal to about 5%. When the polymer has haze within the above range, its light-transmittance may be increased, and thus excellent optical properties of the polymer may be secured. For example, the polymer may have haze of less than or equal to about 2%, for example, about 0.5% to about 2%.

The polymer may have crystallinity of less than or equal to about 50%. When the polymer has crystallinity within the above range, the polymer may have lower haze and accomplish excellent optical properties. For example, the polymer may have crystallinity of about 30% to about 50%.

The dichroic dye includes one or more compounds represented by the following Chemical Formula 1 and having a molecular weight of greater than or equal to about 500 Daltons.

Chemical Formula 1

In Chemical Formula 1, $Ar^1$ to $Ar^3$ are each independently a substituted or unsubstituted C6 to C15 arylene group, $R^1$ is a substituted or unsubstituted C1 to C20 alkyl group, a substituted or unsubstituted C1 to C20 alkoxy group, a substituted or unsubstituted C1 to C20 alkylthio group, or a combination thereof, $R^2$ is hydrogen, a substituted or unsubstituted C1 to C20 alkyl group, a substituted or unsubstituted C6 to C20 aryl group, a C1 to C20 alkoxy group, a substituted or unsubstituted C1 to C20 alkylthio group, —$NR^3R^4$, or a combination thereof, wherein $R^3$ and $R^4$ are each independently hydrogen or a substituted or unsubstituted C1 to C10 alkyl group, and wherein $R^3$ and $R^4$ are optionally linked to each other to form a ring, and n and m are independently 0 or 1.

For example, $Ar^1$ to $Ar^3$ in Chemical Formula 1 may each independently be a substituted or unsubstituted phenylene group, a substituted or unsubstituted naphthalene group, a substituted or unsubstituted biphenylene group.

For example, $R^1$ in Chemical Formula 1 may be a substituted or unsubstituted C4 to C20 alkyl group or a substituted or unsubstituted C4 to C20 alkoxy group.

For example, $R^2$ in Chemical Formula 1 may be hydrogen, a substituted or unsubstituted C4 to C20 alkyl group, —$NR^3R^4$, or a combination thereof, wherein $R^3$ and $R^4$ are each independently hydrogen or a substituted or unsubstituted C1 to C10 alkyl group, and wherein $R^3$ and $R^4$ are optionally linked to each other to form a ring.

The first dichroic dye may be represented by the above Chemical Formula 1 and have a high molecular weight of greater than or equal to about 500 Daltons, and thus may have increased high temperature stability. Accordingly, the diffusion of the first dichroic dye into another layer may be decreased or even prevented when a polarizing film manufactured by including the first dichroic dye is processed at a high temperature for an extended period of time and/or exposed to a high temperature environment. Accordingly, the loss of the dichroic dye may be decreased, and thus desired optical properties of the polarizing film may be maintained.

The first dichroic dye may have, for example, a molecular weight of greater than or equal to about 600 Daltons, for example about 600 Daltons to about 1,000 Daltons. Within the range, the first dichroic dye may have, for example, a molecular weight of about 600 Daltons to about 800 Daltons.

The first dichroic dye may be a yellow dichroic dye having a maximum absorption wavelength ($\lambda_{max}$) in about 380 nanometers (nm) to about 490 nm.

The dichroic dye may include one or more derivatives of the first dichroic dye. In addition, the dichroic dye may further include a dichroic dye having an absorption wavelength region different from the absorption wavelength region of the first dichroic dye. For example, the dichroic dye may include a second dichroic dye having a maximum absorption wavelength ($\lambda_{max}$) greater than about 490 nm and less than or equal to about 580 nm and a third dichroic dye having a maximum absorption wavelength ($\lambda_{max}$) greater than about 580 nm and less than or equal to about 780 nm.

A solubility parameter difference between the polymer and the dichroic dye may be less than about 7.2. The solubility parameter indicates a degree to which two or more compounds interact. The smaller solubility parameter difference the compounds have, the larger their interaction is, while the larger solubility parameter difference the compounds have, the smaller their interaction is.

The solubility parameter has a relation to the structure of a compound. When the polymer and the dichroic dye have a solubility parameter difference within the above range, the polymer and the dichroic dye have a high degree of interaction during the manufacture of a polarizing film, thus increasing the melt-blending property of the polymer, preventing agglomeration of the dichroic dyes in the polymer, and uniformly dispersing the dichroic dye in the polymer.

A solubility parameter difference between the polymer and the dichroic dye may be less than or equal to about 7.0, or less than or equal to about 6.7.

The solubility parameter of the polymer may be, for example, about 15 to about 18. In this embodiment, the solubility parameter of the dichroic dye may be, for example, less than about 24.

The dichroic dye may have a melting point of greater than or equal to about 100° C. Within the above range of the melting point, the dichroic dye may be readily melt-blended with the polymer to provide a film.

The decomposition temperature of the dichroic dye may be greater than or equal to about 245° C. Herein, the decomposition temperature indicates a temperature at which the weight of the dichroic dye decreases by about 5% relative to its initial weight.

The dichroic dye may be included in an amount of about 0.01 to about 5 parts by weight based on 100 parts by weight of the polymer. Within the above range, desired polarization characteristics may be obtained without deteriorating transmittance of a polarizing film. For example, the dichroic dye may be included in an amount of about 0.05 to about 1 part by weight based on 100 parts by weight of the polymer.

The composition for a polarizing film may include the polymer and the dichroic dye in a form of a solid, for example a powder. The composition for a polarizing film may have, for example, a solid content of greater than or equal to about 90 wt %, and for example, may not include a solvent.

The polarizing film may be manufactured by melt-blending and elongating the composition for a polarizing film at a temperature of greater than or equal to the melting point ($T_m$) of the polymer. For example, the polarizing film may be manufactured by a process including:

melt-blending the composition for a polarizing film to prepare a melt-blend, placing the melt-blend into a mold and pressing it into a sheet, and elongating the sheet in a uniaxial direction.

The melt-blending may be performed at a temperature of less than or equal to about 300° C., and for example, in a range from about 130 to about 300° C.

The sheet may be formed by placing the melt-blend in the mold under a high pressure, or discharging it in a chill roll through a T-die.

The elongation in a uniaxial direction may be performed in a temperature range from about 25 to about 200° C. at an elongation rate of from about 400% to about 1,000%. The elongation rate refers to a length ratio of after the elongation to before the elongation of the sheet, and reflects the elongation extent of the sheet after uniaxial elongation.

Hereinafter, a polarizing film obtained from the composition for the polarizing film is described referring to drawings.

FIG. 1 is a schematic view showing a polarizing film according to an embodiment.

Referring to FIG. 1, a polarizing film 70 according to an embodiment includes a polymer 71 and a dichroic dye 72.

The polymer 71 is elongated in a uniaxial direction, for example in the length direction of the dichroic dye 72.

The dichroic dye 72 is dispersed in the polymer 71, and is aligned in the elongation direction of the polymer 71. The dichroic dye 72 may transmit one perpendicular polarization component of two perpendicular polarization components in light of a predetermined wavelength region.

The polymer 71 and the dichroic dye 72 are each the same as described above.

The polarizing film 70 may be a melt-blend of the polymer 71 and the dichroic dye 72. The melt-blend may be obtained by melt-blending the above-described composition for a polarizing film at a temperature of greater than or equal to the melting point ($T_m$) of the polymer 71.

As described above, the dichroic dye 72 may be limited and/or prevented from diffusing outside the polarizing film 70 at a high temperature, by including the first dichroic dye. For example, the polarizing film 70 may have a light transmittance variation ratio (ΔT) of less than or equal to about 1.0% and a color shift (Δa*b*) of less than or equal to about 2 upon standing at about 85° C. for 250 hours by decreasing the loss of the dichroic dye 72. Accordingly, the polarizing film 70 is prevented from deteriorating its optical properties during a subsequent high temperature process and/or upon standing at a high temperature, thus increasing its reliability.

The polarizing film 70 may have a dichroic ratio of greater than or equal to about 5 at a maximum absorption wavelength ($\lambda_{max}$) of a visible ray region. Within the above range, the dichroic ratio may be about 5 to about 10. Herein, the dichroic ratio may be calculated by dividing plane polarization absorbance in a vertical direction with the axis of a polymer by polarization absorbance in a horizontal direction according to the following Equation 1.

$$DR = Log(1/T_\perp)/Log(1/T_\parallel) \quad \text{Equation 1}$$

In Equation 1,

DR denotes a dichroic ratio of a polarizing film, $T_\parallel$ is light transmittance of light entering parallel to the transmissive axis of a polarizing film, and $T_\perp$ is light transmittance of light entering perpendicular to the transmissive axis of the polarizing film.

The dichroic ratio shows a degree to which the dichroic dye 72 is arranged in the polarizing film 70 in one direction. When the polarizing film 70 has a dichroic ratio within the above range in the visible ray wavelength region, the dichroic dye 72 is arranged according to arrangement of polymer chains, thus improving polarization characteristics of the polarizing film 70.

The polarizing film 70 may have polarization efficiency of greater than or equal to about 90%, for example, from about 95% to about 100% within the above range. Herein, the polarization efficiency may be obtained by the following Equation 2.

$$PE\ (\%) = [(T_\parallel - T_\perp)/(T_\parallel + T_\perp)]^{1/2} \times 100 \quad \text{Equation 2}$$

In Equation 2,

PE denotes polarization efficiency, $T_\parallel$ is transmittance of light entering parallel to the transmissive axis of a polarizing film, and $T_\perp$ is transmittance of light entering perpendicular to the transmissive axis of the polarizing film.

The polarizing film 70 may have transmittance of greater than or equal to about 30%, for example, from about 30% to about 95% within the above range in a visible ray region of about 400 nm to about 780 nm. When the polarizing film 70 having light transmittance within the above range is applied to one side of a display device, light emission from the display device may not be prevented.

The polarizing film 70 may have a relatively low thickness of less than or equal to about 100 micrometers (μm), for example about 30 μm to about 95 μm. When the polarizing film 70 has a thickness within the above ranges, it may be significantly thinner than a polarizing plate requiring a protective layer such as triacetyl cellulose (TAC), and may be used to realize a thin display device.

The polarizing film may be applied to various display devices.

The display device may be a liquid crystal display (LCD).

Figure 2:
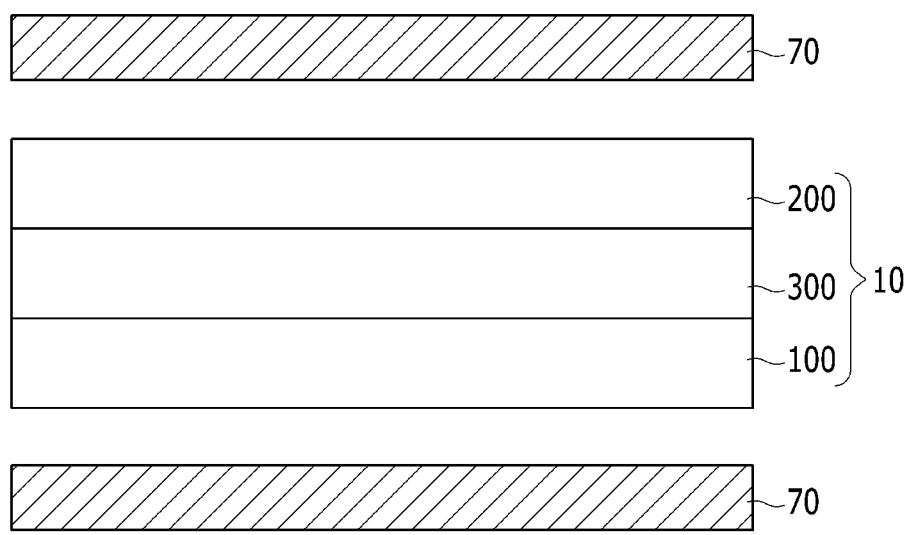
FIG. 2 is a cross-sectional view showing a liquid crystal display (LCD) according to an embodiment.

FIG. 2 is a cross-sectional view showing a liquid crystal display (LCD) according to an embodiment.

Referring to FIG. 2, the liquid crystal display (LCD) includes a liquid crystal display panel 10 and a polarizing film 70 disposed on both the lower part and the upper part of the liquid crystal display panel 10.

The liquid crystal display panel 10 may be a twist nematic (TN) mode panel, a patterned vertical alignment (PVA) mode panel, an in-plane switching (IPS) mode panel, an optically compensated bend (OCB) mode panel, and the like.

The liquid crystal display panel 10 includes a first display plate 100, a second display plate 200, and a liquid crystal layer 300 interposed between the first display plate 100 and the second display plate 200.

The first display plate 100 may include, for example, a thin film transistor (not shown) formed on a substrate (not shown), and a first electric field generating electrode (not shown) connected thereto. The second display plate 200 may include, for example, a color filter (not shown) formed on the substrate, and a second electric field generating electrode (not shown). However, the first and second display plates are not limited thereto, and the color filter may be included in the first display plate 100, and both the first electric field generating electrode and the second electric field generating electrode may be disposed in the first display plate 100.

The liquid crystal layer 300 may include a plurality of liquid crystal molecules. The liquid crystal molecules may have positive or negative dielectric anisotropy. When the liquid crystal molecules have positive dielectric anisotropy, the long axis thereof may be aligned substantially parallel to the surface of the first display plate 100 and the second display plate 200 when an electric field is not applied, and may be aligned substantially perpendicular to the surface of the first display plate 100 and the second display plate 200 when an electric field is applied. On the contrary, when the liquid crystal molecules have negative dielectric anisotropy, the long axes thereof may be aligned substantially perpendicular to the surface of the first display plate 100 and the second display plate 200 when an electric field is not applied, and may be aligned substantially parallel to the surface of the first display plate 100 and the second display plate 200 when an electric field is applied.

The polarizing film 70 is disposed on the outside of the liquid crystal display panel 10. Although the drawing shows the polarizing film 70 to be disposed on the upper part and lower part of the liquid crystal display panel 10, it may be formed on either the upper part or the lower part of the liquid crystal display panel 10.

The polarizing film 70 is the same as described above.

The display device may be an organic light emitting diode (OLED) display.

Figure 3:
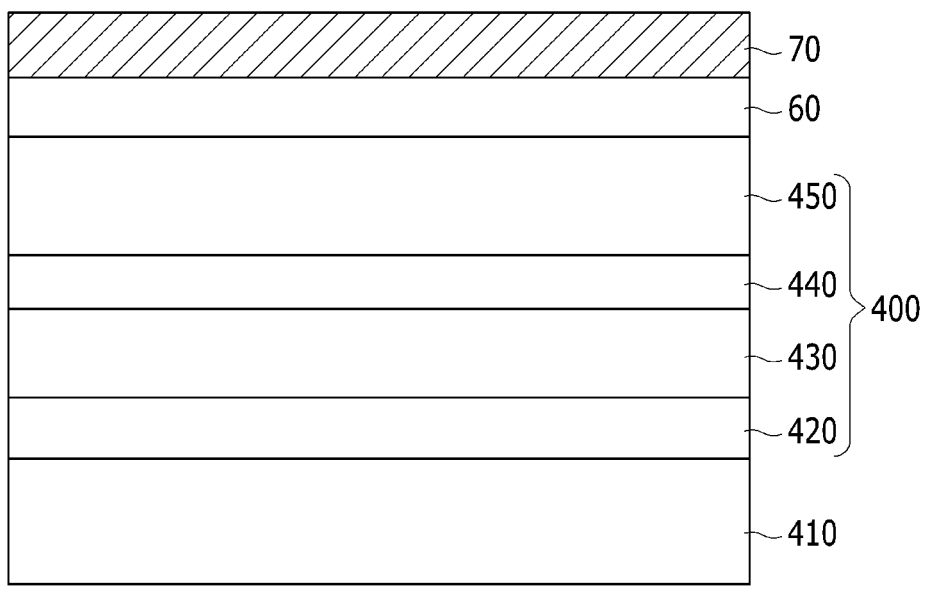
FIG. 3 is a cross-sectional view showing an organic light emitting diode (OLED) display according to an embodiment.

FIG. 3 is a cross-sectional view showing an organic light emitting diode (OLED) display according to an embodiment.

Referring to FIG. 3, an organic light emitting diode (OLED) display according to an embodiment includes an organic light emitting panel 400, a compensation film 60, and a polarizing film 70.

The organic light emitting panel 400 includes a base substrate 410, a lower electrode 420, an organic emission layer 430, an upper electrode 440, and an encapsulation substrate 450.

The base substrate 410 may be formed of glass or plastic.

One of the lower electrode 420 and the upper electrode 440 may be an anode, while the other one may be a cathode. The anode is an electrode where holes are injected. It is formed of a transparent conductive material having a high work function and externally transmitting entered light, for example, ITO or IZO. The cathode is an electrode where electrons are injected. It is formed of a conducting material having a low work function and having no influence on an organic material, and is selected from, for example, aluminum (Al), calcium (Ca), and barium (Ba).

The organic emission layer 430 includes an organic material emitting light when a voltage is applied between the lower electrode 420 and the upper electrode 440.

An auxiliary layer (not shown) may be included between the lower electrode 420 and the organic emission layer 430 and between the upper electrode 440 and the organic emission layer 430. The auxiliary layer may include a hole transport layer (HTL), a hole injection layer (HIL), an electron injection layer (EIL), and/or an electron transport layer (ETL) for balancing electrons and holes.

The encapsulation substrate 450 may be made of glass, metal, or a polymer. The lower electrode 420, the organic emission layer 430, and the upper electrode 440 are sealed to prevent moisture and/or oxygen from flowing in.

The compensation film 60 may circularly polarize light passing through the polarizing film 70, generating a phase difference. Thus, the compensation film 60 has an influence on reflection and absorption of the light. The compensation film 60 may be, for example, a phase difference film such as λ/4 plate, λ/2 plate, and a combination thereof, and may be omitted depending on the embodiment.

The polarizing film 70 may be disposed at a light-emitting side. For example, the polarizing film 70 may be disposed outside of the base substrate 410 in a bottom emission type in which light emits through the base substrate 410, and outside of the encapsulation substrate 450 in a top emission type in which light emits through the encapsulation substrate 450.

The polarizing film 70 is the same as described above.

The compensation film 460 and polarizing film 70 may be disposed at a display screen of an organic light emitting diode (OLED) display, and thus may play a role of an antireflective film preventing reflection of light flowing in from the outside. The antireflective film may prevent visibility deterioration due to the reflection of the light flowing in from the outside.

Hereinafter, the present disclosure is illustrated in more detail with reference to examples. However, these examples are exemplary, and the present disclosure is not limited thereto.

Synthesis of Dichroic Dye

Synthesis Example 1

1-1. Synthesis of Monoazo Compound 10 grams (g) (72.4 millimoles (mmol)) of 4-nitroaniline (Sigma-Aldrich Co., Ltd.) are dissolved in 500 milliliters (mL) of water and 24 mL of 12 normal (N) HCl, and a solution obtained by dissolving 5.49 g (79.6 mmol) of sodium nitrite (NaNO$_2$) in 100 mL of water is slowly added by drops. When the addition is complete, the reaction mixture is agitated for one hour at 0° C. Subsequently, 5.8 g of sodium hydroxide (NaOH) and 72.4 mmol of phenol are dissolved in 100 mL of methanol and 50 mL of water, and the solution is slowly added to the reaction mixture by drops, and the resulting mixture is agitated at 0° C. The reactant is neutralized by a sodium hydroxide (NaOH) aqueous solution to complete the reaction, and a solid precipitate is filtered. This collected solid precipitate is washed several times with water and dried to obtain a monoazo compound. Yield is 73%.

10 g (41.11 mmol) of the monoazo compound is dissolved in 200 mL of acetone, and 14.5 g (41.11 mmol) of 1-iodohexadecane and 28.4 g (205.6 mmol) of potassium carbonate (K$_2$CO$_3$) are added thereto. Subsequently, the reaction mixture is refluxed and agitated at 60° C. for 24 hours and cooled down to room temperature. The reaction mixture is concentrated, the precipitated solid is washed several times with water and filtered, to obtain 16 g (34.2 mmol) of a compound (4-nitro). Yield is 83%.

7 g (14.97 mmol) of the purified 4-nitro compound is dissolved in 300 mL of hot ethanol, and 10.07 g (59.87 mmol) of Na$_2$S.5H$_2$O dissolved in hot ethanol and water is added thereto. Subsequently, the reaction mixture is agitated at 80° C. for 5 hours and cooled down to room temperature. The solid precipitated therein is filtered, washed several times, and dried to obtain 5.4 g (12.34 mmol) of 4-(((4-hexadecyloxy)phenyl) diazenyl)aniline. Yield is 82%.

1-2. Synthesis of Bisazo Compound 3 g (6.85 mmol) of the obtained 4-(((4-hexadecyloxy)phenyl) diazenyl)aniline is dissolved in 100 mL of dimethyl formamide (DMF) and 25 mL of acetic acid (AcOH). 2.28 mL of 12 N HCl is added thereto, and the mixture is maintained at 0° C. Subsequently, 520 mg (7.54 mmol) of sodium nitrite (NaNO$_2$) is dissolved in 5 mL of water, and the solution is slowly added thereto by drops. When the addition is complete, the reactant is agitated for one hour at 0° C. 1.11 mg (6.85 mmol) of 4-hexylaniline is dissolved in 25 mL of methanol and 2 mL of dimethyl formamide (DMF), the prepared solution is slowly added to the reaction mixture by drops, and the resulting mixture is agitated at 0° C. for one hour. The reactant is neutralized by a sodium hydroxide (NaOH) aqueous solution to complete the reaction, and the solid precipitated therein is filtered. The mixture is purified through silica gel column chromatography (n-hexane:EtOAc=3:1), to obtain 3.1 g (5.07 mmol) of a dichroic dye represented by the following Chemical Formula 1a. Yield is 74%.

Chemical Formula 1a

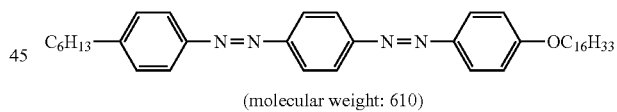

(molecular weight: 610)

The structure of the dichroic dye represented by Chemical Formula 1a is analyzed through $^1$H NMR.

The $^1$H NMR analysis result is provided as follows.

$^1$H NMR (500 MHz, CDCl$_3$) δ(ppm): 0.86-0.90 (m, 6H, CH$_3$×2), 1.29-1.37 (m, 30H, CH$_2$×15), 1.44-1.49 (m, 2H, CH$_2$), 1.63-1.67 (m, 2H, CH$_2$), 1.79-1.83 (m, 2H, CH$_2$), 2.69 (t, J=7.5 Hz, 2H, ArCH$_2$), 4.04 (t, J=6.5 Hz, 2H, OCH$_2$), 7.02 (d, J=7.0 Hz, 2H, ArH), 7.34 (d, J=8.5 Hz, 2H, ArH), 7.87 (d, J=6.5 Hz, 2H, ArH), 7.94 (d, J=7.0 Hz, 2H, ArH), 7.99-8.04 (m, 4H, ArH).

Synthesis Example 2

A dichroic dye represented by the following Chemical Formula 1b is obtained according to the same method as described in Synthesis Example 1, except for using 4-octylaniline instead of the 4-hexylaniline.

Chemical Formula 1b

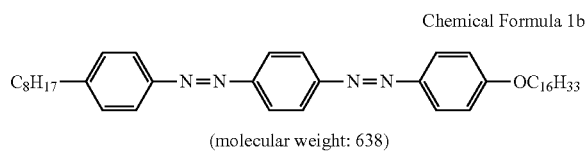

(molecular weight: 638)

The structure of the dichroic dye represented by Chemical Formula 1b is analyzed through $^1$H NMR.

The $^1$H NMR analysis result is provided as follows.

$^1$H NMR (500 MHz, CDCl$_3$) δ(ppm): 0.86-0.89 (m, 6H, CH$_3$×2), 1.25-1.33 (m, 30H, CH$_2$×15), 1.45-1.51 (m, 2H, CH$_2$), 1.63-1.69 (m, 2H, CH$_2$), 1.81-1.84 (m, 2H, CH$_2$), 2.69 (t, J=7.5 Hz, 2H, ArCH$_2$), 4.05 (t, J=6.5 Hz, 2H, OCH$_2$), 7.01 (d, J=7.0 Hz, 2H, ArH), 7.33 (d, J=8.5 Hz, 2H, ArH), 7.87 (d, J=8.5 Hz, 2H, ArH), 7.94 (d, J=7.0 Hz, 2H, ArH), 7.99-8.04 (m, 4H, ArH).

Synthesis Example 3

A dichroic dye represented by the following Chemical Formula 1c is obtained according to the same method as described in Synthesis Example 1, except for using 2-chlorophenol instead of the phenol and N,N-diethylaniline instead of the 4-hexylaniline.

Chemical Formula 1c

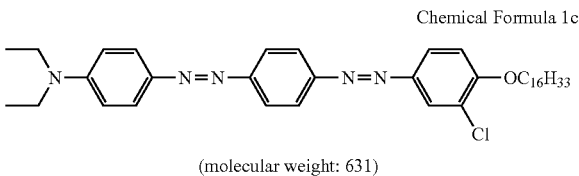

(molecular weight: 631)

The structure of the dichroic dye represented by Chemical Formula 1c is analyzed through $^1$H NMR.

The $^1$H NMR analysis result is provided as follows.

$^1$H NMR (500 MHz, CDCl$_3$) δ(ppm): 0.88 (t, J=6.5 Hz, 3H, CH$_3$), 1.30-1.40 (m, 20H, CH$_2$×10), 1.49-1.55 (m, 2H, CH$_2$), 1.86-1.91 (m, 2H, CH$_2$), 3.47 (dd, J$_1$=7.5 Hz, J$_2$=7.0 Hz, 4H, CH$_2$×2), 4.12 (t, J=6.5 Hz, 2H, OCH$_2$), 6.74 (d, J=7.5 Hz, 2H, ArH), 7.04 (d, J=8.5 Hz, 1H, ArH), 7.86-7.91 (m, 3H, ArH), 7.94-8.00 (m, 4H, ArH), 8.02 (d, J=2.5 Hz, 1H, ArH).

Synthesis Example 4

A dichroic dye represented by the following Chemical Formula 1d is obtained according to the same method as described in Synthesis Example 1, except for using 2-chlorophenol instead of the phenol, 1-bromoicosane instead of the 1-iodohexadecane, and N,N-dimethylaniline instead of the 4-hexylaniline.

Chemical Formula 1d

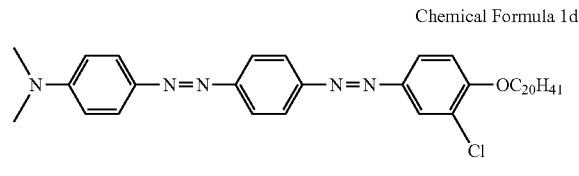

(molecular weight: 660)

The structure of the dichroic dye represented by Chemical Formula 1d is analyzed through $^1$H NMR.

$^1$H NMR (300 MHz, CDCl$_3$) δ(ppm): 0.91 (t, J=6.6 Hz, 3H, CH$_3$), 1.31-1.39 (m, 6H, CH$_2$×3), 1.47-1.52 (m, 2H, CH$_2$), 1.85-1.92 (m, 2H, CH$_2$), 3.11 (s, 6H, CH$_3$×2), 4.12 (t, J=6.5 Hz, 2H, OCH$_2$), 6.77 (d, J=9.1 Hz, 2H, ArH), 7.04 (d, J=8.8 Hz, 1H, ArH), 7.86-8.03 (m, 8H, ArH).

Comparative Synthesis Example 1

A dichroic dye represented by the following Chemical Formula A is obtained according to the same method as described in Synthesis Example 4, except for using 1-bromopropane instead of the 1-iodohexadecane and butylbenzene of the 4-hexylaniline.

Chemical Formula A

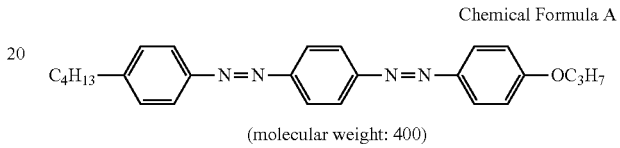

(molecular weight: 400)

The structure of the dichroic dye represented by Chemical Formula A is analyzed through $^1$H NMR.

The $^1$H NMR analysis result is provided as follows.

$^1$H NMR (300 MHz, CDCl$_3$) δ(ppm): 0.95 (t, J=7.3 Hz, 3H, CH$_3$), 1.07 (t, J=7.3 Hz, 3H, CH$_3$), 1.34-1.43 (m, 2H, CH$_2$), 1.58-1.66 (m, 2H, CH$_2$), 1.82-1.89 (m, 2H, CH$_2$), 2.70 (t, J=7.7 Hz, 2H, ArCH$_2$), 4.01 (t, J=6.6 Hz, 2H, OCH$_2$), 7.01 (d, J=9.0 Hz, 2H, ArH), 7.33 (d, J=8.4 Hz, 2H, ArH), 7.86-8.02 (m, 8H, ArH).

Comparative Synthesis Example 2

A dichroic dye represented by the following Chemical Formula B is obtained according to the same method as described in Synthesis Example 4, except for using 1-bromoheptane instead of the 1-bromoicosane.

Chemical Formula B

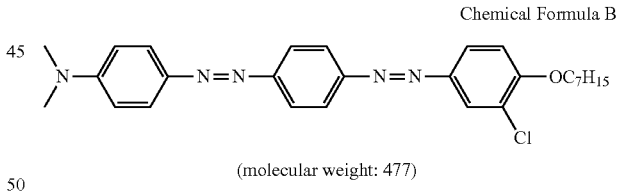

(molecular weight: 477)

The structure of the dichroic dye represented by Chemical Formula B is analyzed through $^1$H NMR.

The $^1$H NMR analysis result is provided as follows.

$^1$H NMR (300 MHz, CDCl$_3$) δ(ppm): 0.91 (t, J=6.6 Hz, 3H, CH$_3$), 1.31-1.39 (m, 6H, CH$_2$×3), 1.47-1.52 (m, 2H, CH$_2$), 1.85-1.92 (m, 2H, CH$_2$), 3.11 (s, 6H, CH$_3$×2), 4.12 (t, J=6.5 Hz, 2H, OCH$_2$), 6.77 (d, J=9.1 Hz, 2H, ArH), 7.04 (d, J=8.8 Hz, 1H, ArH), 7.86-8.03 (m, 8H, ArH).

Calculation of Solubility Parameter

Solubility parameters of the dichroic dyes according to Synthesis Examples 1 to 4 and Comparative Synthesis Examples 1 and 2 are calculated using a Hildebrand solubility parameter.

Molecules are cohered due to cumulative bonding action of van der Waals force, dipole moment, and the like, and energy for the cohesion is defined as cohesive energy ($E_{coh}$).

This cohesion energy is expressed as internal cohesive energy ($E_{coh}$) change per mole according to the following Relationship Equation 1.

$$E_{coh} = \Delta U = \Delta H - \Delta T \quad \text{Relationship Equation 1}$$

In the Relationship Equation 1,
$E_{coh}$ indicates cohesion energy,
$\Delta U$ indicates the amount of internal energy change per mole,
$\Delta H$ indicates the amount of enthalpy change, and
$\Delta T$ indicates the amount of temperature change.

In addition, cohesive energy per unit volume may be defined by cohesive energy density (CED), and the cohesive energy density may be expressed by the following Relationship Equation 2.

$$CED = (\Delta H - RT)/V_m \quad \text{Relationship Equation 2}$$

In the Relationship Equation 2,
CED indicates cohesive energy density,
$\Delta H$ indicates enthalpy change amount,
R is a constant,
T is a temperature, and
$V_m$ is a mole volume.

The cohesive energy density is used to define a Hildebrand solubility parameter able to express dissolving capability, and the solubility parameter is calculated by using a density or a mole volume at a particular temperature according to the following Relationship Equation 3.

$$\delta = (CED)^{0.5} = (\Sigma E_{coh}^{i}/\Sigma V_m^{i})^{0.5} \quad \text{Relationship Equation 3}$$

In the Relationship Equation 3,
$\delta$ is a solubility parameter,
CED is cohesive energy density,
$E_{coh}^{i}$ is cohesive energy of a functional group i in a molecule, and $V_m^{i}$ is a mole volume.

The Hildebrand solubility parameter value used to design the structure of the dichroic dyes may be calculated through group contribution of a molecule.

Group contribution of cohesive energy ($E_{coh}$) and mole volume ($V_m$) used to calculate the solubility parameter of the dichroic dyes is provided in Table 1. (Reference Article: *Polym. Eng. Sci.* 1974, 14, 147; *J. Appl. Polym. Sci.* 2005, 96, 416.)

TABLE 1

| Group | $E_{coh}$ (J/mol) | $V_m$ (cm³/mol) |
|---|---|---|
| —CH$_3$ | 4707 | 33.5 |
| —CH$_2$— | 4937 | 16.1 |
| —CH— | 3431 | −1.0 |
| C | 1464 | −19.2 |
| H$_2$C═ | 4310 | 28.5 |
| —CH═ | 4310 | 13.5 |
| C═ | 4310 | −5.5 |
| Phenyl | 31924 | 71.4 |
| Phenylene (o, m, p) | 31924 | 52.4 |
| Phenyl (trisubstituted) | 31924 | 33.4 |
| Phenyl (tetrasubstituted) | 31924 | 14.4 |
| Phenyl (pentasubstituted) | 31924 | −4.6 |
| Phenyl (hexasubstituted) | 31924 | −23.6 |
| Ring closure 5 or more atoms | 1046 | 16.0 |
| Ring closure 3 or 4 atoms | 3138 | 18.0 |
| —COOH | 27614 | 28.5 |
| —CO$_2$— | 17991 | 18.0 |
| —CO— | 17364 | 10.8 |
| —CONH— | 33472 | 9.5 |
| —NH$_2$ | 12552 | 19.2 |
| —NH— | 8368 | 4.5 |
| N | 4184 | −9.0 |
| —N═ | 11715 | 5.0 |
| —N═N— | 4188 | 0.0 |

TABLE 1-continued

| Group | $E_{coh}$ (J/mol) | $V_m$ (cm³/mol) |
|---|---|---|
| —CN | 25522 | 24.0 |
| NO$_2$ | 15355 | 32.0 |
| —O— | 3347 | 3.8 |
| —OH | 29790 | 10.0 |
| S | 14142 | 12.0 |
| —F | 4184 | 18.0 |
| —Cl | 11548 | 24.0 |
| —Br | 15481 | 30.0 |
| —I | 19037 | 31.5 |

Solubility parameters of the dichroic dyes calculated according to Synthesis Examples 1 to 4 and Comparative Synthesis Examples 1 and 2 are shown in Table 2.

TABLE 2

|  | Molecular weight | Solubility parameter |
|---|---|---|
| Synthesis Example 1 | 610 | 19.8 |
| Synthesis Example 2 | 638 | 19.7 |
| Synthesis Example 3 | 631 | 20.9 |
| Synthesis Example 4 | 660 | 20.3 |
| Comparative Synthesis Example 1 | 400 | 21.4 |
| Comparative Synthesis Example 2 | 477 | 21.7 |

Manufacture of Polarizing Film I

Example 1

A composition for a polarizing film is prepared by mixing a polyolefin (solubility parameter: 16.6) including polypropylene (PP) and a polypropylene-polyethylene copolymer (PP-PE) in a ratio of 6:4 (weight to weight (w/w)) with 0.5 parts by weight of the dichroic dye of Synthesis Example 1 based on 100 parts by weight of the polyolefin. The composition for a polarizing film is melt-kneaded at about 250° C. by using a micro-compounder made by DSM. Subsequently, the melted mixture is placed in a sheet-shaped mold and pressed at a high temperature with a high pressure to manufacture a non-elongated polarizing film.

Example 2

A non-elongated polarizing film is manufactured according to the same method as Example 1, except for using 0.76 parts by weight of the dichroic dye according to Synthesis Example 2.

Example 3

A non-elongated polarizing film is manufactured according to the same method as Example 1, except for using the dichroic dye according to Synthesis Example 2 instead of the dichroic dye according to Synthesis Example 1.

Example 4

A non-elongated polarizing film is manufactured according to the same method as Example 3, except for using 0.8 parts by weight of the dichroic dye according to Synthesis Example 2.

Example 5

A non-elongated polarizing film is manufactured according to the same method as Example 1, except for using 0.66 parts by weight of the dichroic dye according to Synthesis Example 3 instead of the dichroic dye according to Synthesis Example 1.

Example 6

A non-elongated polarizing film is manufactured according to the same method as Example 1, except for using 0.69 parts by weight of the dichroic dye according to Synthesis Example 4 instead of the dichroic dye according to Synthesis Example 1.

Comparative Example 1

A non-elongated polarizing film is manufactured according to the same method as Example 1, except for using the dichroic dye according to Comparative Synthesis Example 1 instead of the dichroic dye according to Synthesis Example 1.

Comparative Example 2

A non-elongated polarizing film is manufactured according to the same method as Example 1, except for using the dichroic dye according to Comparative Synthesis Example 2 instead of the dichroic dye according to Synthesis Example 1.

Evaluation I

Each non-elongated polarizing film according to Examples 1 to 6 and Comparative Examples 1 and 2 is attached to a transparent vinyl tape (Scotch Tape, 3M) and placed in an oven at 85° C. for 2 hours. Subsequently, the non-elongated polarizing film is taken out of the oven and detached from the transparent vinyl tape. The absorbance of the transparent vinyl tape is measured to examine the amount of a dichroic dye transferred to the transparent vinyl tape.

The maximum absorption wavelength and the absorbance of the film are measured by using a spectrophotometer (V-7100, JASCO Co., Ltd.).

The results are shown in Table 3.

TABLE 3

| | Molecular weight of dichroic dye | Maximum absorption wavelength ($\lambda_{max}$) | Absorbance (@$\lambda_{max}$) |
|---|---|---|---|
| Example 1 | 610 | 390 | 0.005 |
| Example 2 | 610 | 390 | 0.007 |

TABLE 3-continued

| | Molecular weight of dichroic dye | Maximum absorption wavelength ($\lambda_{max}$) | Absorbance (@$\lambda_{max}$) |
|---|---|---|---|
| Example 3 | 638 | 385 | 0 |
| Example 4 | 638 | 385 | 0 |
| Example 5 | 631 | 470 | 0.003 |
| Example 6 | 660 | 460 | 0.051 |
| Comparative Example 1 | 400 | 385 | 0.151 |
| Comparative Example 2 | 477 | 460 | 0.103 |

Referring to Table 3, a transparent vinyl tape attached to each non-elongated polarizing film according to Examples 1 to 6 shows remarkably low absorbance compared with the transparent vinyl tape attached to each non-elongated polarizing film according to Comparative Examples 1 and 2. Accordingly, the amount of a dichroic dye diffused from the non-elongated polarizing films of Examples 1 to 6 to the transparent vinyl tape at a high temperature is much lower than the amount of a dichroic dye diffused from the non-elongated polarizing films of Comparative Examples 1 and 2 to the transparent vinyl tape. Accordingly, the non-elongated polarizing films according to Examples 1 to 6 show high temperature stability.

Manufacture of Polarizing Film II

Example 7

A composition for a polarizing film is prepared by mixing a polyolefin (solubility parameter: 16.6) including polypropylene (PP) and a polypropylene-polyethylene copolymer (PP-PE) in a ratio of 6:4 (w/w) with 0.5 parts by weight of the dichroic dye of Synthesis Example 1 based on 100 parts by weight of the polyolefin. Herein, the dichroic dye includes the dichroic dye (yellow) of the Synthesis Example 1, the dichroic dye (yellow) of the Synthesis Example 3, a dichroic dye (red) represented by the following Chemical Formula C, and a dichroic dye (blue) represented by the following Chemical Formula D in a weight ratio of 0.3:0.25:0.2:0.4. The composition for a polarizing film is melt-kneaded at about 250° C. by using a micro-compounder made by DSM. Subsequently, the melted mixture is placed in a sheet-shaped mold and pressed at a high temperature with a high pressure to manufacture a non-elongated polarizing film.

Then, the film is elongated in a uniaxial direction (Instron, tensile tester) at 125° C. at an elongation rate of 1,000% to manufacture a polarizing film.

Chemical Formula C

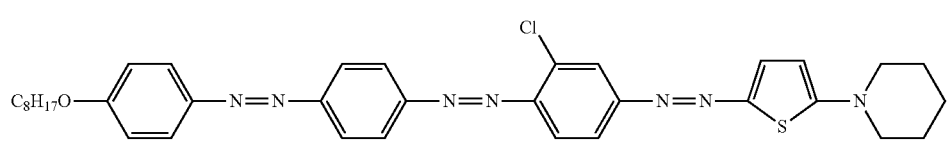

Chemical Formula D

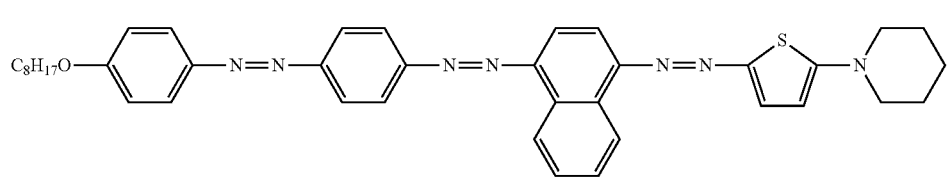

Comparative Example 3

A non-elongated polarizing film is manufactured according to the same method as Example 7, except that the dichroic dye includes the dichroic dye (yellow) of the Comparative Synthesis Example 1, the dichroic dye (yellow) of the Comparative Synthesis Example 2, the dichroic dye (red) represented by Chemical Formula C, and the dichroic dye (blue) represented by Chemical Formula D in a weight ratio of 0.3:0.25:0.2:0.4.

Evaluation II

High temperature stability of the polarizing films according to Example 7 and Comparative Example 3 is evaluated.

The high temperature stability is evaluated by first measuring the light transmittance ($T_s$), polarizing efficiency (PE), and reflection color (a*, b*) of the polarizing films prepared according to Example 7 and Comparative Example 3, allowing the polarizing films to stand at 85° C. for 250 hours, re-measuring their light transmittance, polarizing efficiency, and reflection color, and then calculating their changes.

The light transmittance is measured by using a UV-VIS spectrophotometer (V-7100, JASCO Co., Ltd.), the reflection color is measured by using a spectrum colorimeter (CM-3600d, Minolta Co., Ltd.), and the polarizing efficiency is calculated according to the following Equation 2.

$$PE\ (\%)=[(T_\parallel-T_\perp)/(T_\parallel+T_\perp)]^{1/2}\times 100 \quad \text{Equation 2}$$

In Equation 2,

PE denotes polarizing efficiency, $T_\parallel$ is transmittance of light entering parallel to the transmissive axis of a polarizing film, and $T_\perp$ is transmittance of light entering perpendicular to the transmissive axis of the polarizing film.

The results are shown in Table 4.

TABLE 4

| | ΔTs (%) | Δa* | Δb* | Δa*b* |
|---|---|---|---|---|
| Example 7 | −0.8 | 0.5 | 1.6 | 1.67 |
| Comparative Example 3 | −5.0 | 0.8 | 7.7 | 2.57 |

Referring to Table 4, the polarizing films of Example 7 and Comparative Example 3 are allowed to stand at a high temperature for an extended period of time. The polarizing film of Example 7 showed smaller light transmittance and color shift changes compared with the polarizing film of Comparative Example 3. Accordingly, the polarizing film of Example 7 shows high temperature stability compared with the polarizing film of Comparative Example 3.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A composition for a polarizing film, comprising:
    a polymer and
    at least one dichroic dye uniformly dispersed in the polymer,
    wherein the polymer is a polyolefin, a polyamide, a polyester, a polyacrylate, a polystyrene, a copolymer thereof, or a combination thereof, having a haze of less than or equal to 2%, and a solubility parameter of 15 to 18,
    wherein the dichroic dye comprises a first dichroic dye represented by Chemical Formula 1 and having a molecular weight of about 600 Daltons to about 1,000 Daltons and a solubility parameter of less than or equal to 20.9:

Chemical Formula 1

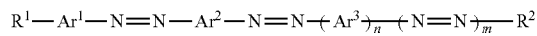

wherein, in Chemical Formula 1,
    $Ar^1$ to $Ar^3$ are each independently a substituted or unsubstituted phenylene group,
    $R^1$ is a substituted or unsubstituted C1 to C20 alkyl group, a substituted or unsubstituted C1 to C20 alkoxy group, a substituted or unsubstituted C1 to C20 alkylthio group, or a combination thereof,
    $R^2$ is hydrogen, a substituted or unsubstituted C1 to C20 alkyl group, a substituted or unsubstituted C6 to C20 aryl group, a C1 to C20 alkoxy group, a substituted or unsubstituted C1 to C20 alkylthio group, $-NR^3R^4$, or a combination thereof, wherein $R^3$ and $R^4$ are each independently hydrogen or a substituted or unsubstituted C1 to C10 alkyl group, and wherein $R^3$ and $R^4$ are optionally linked to each other to form a ring, and
    n is 0 or 1, and
    m is 0,
    wherein a solubility parameter difference between the polymer and the dichroic dye is less than 7.2, and
    wherein a 30 μm-thick film formed from the composition, has a color shift (Δa*b*) of less than 2 upon standing at 85° C. for 250 hours.

2. The composition for a polarizing film of claim 1, wherein
    $R^1$ in Chemical Formula 1 is a substituted or unsubstituted C4 to C20 alkyl group or a substituted or unsubstituted C4 to C20 alkoxy group, and
    $R^2$ in Chemical Formula 1 is hydrogen, a substituted or unsubstituted C1 to C20 alkyl group, $-NR^3R^4$, or a combination thereof, wherein $R^3$ and $R^4$ are each independently hydrogen or a substituted or unsubstituted C1 to C10 alkyl group, and wherein $R^3$ and $R^4$ are optionally linked to each other to form a ring.

3. The composition for a polarizing film of claim 1, wherein the first dichroic dye has a maximum absorption wavelength $\lambda_{max}$ of about 380 nanometers to about 490 nanometers.

4. The composition for a polarizing film of claim 1, wherein the dichroic dye further comprises a second dichroic dye having a maximum absorption wavelength $\lambda_{max}$ of greater than about 490 nanometers and less than or equal to about 580 nanometers, a third dichroic dye having a maximum absorption wavelength $\lambda_{max}$ of greater than about 580 nanometers and less than or equal to about 780 nanometers, or a combination thereof.

5. The composition for a polarizing film of claim 1, wherein the polymer comprises polyethylene, polypropylene, polyethylene terephthalate, polyethylene terephthalate glycol, polyethylene naphthalate, nylon, a copolymer thereof, or a combination thereof.

6. The composition for a polarizing film of claim 1, wherein an amount of the dichroic dye is about 0.01 to 5 parts by weight based on 100 parts by weight of the polymer.

7. A polarizing film comprising:

a polymer and at least one dichroic dye uniformly dispersed in the polymer, wherein the polymer is a polyolefin, a polyamide, a polyester, a polyacrylate, a polystyrene, a copolymer thereof, or a combination thereof, having a haze of less than or equal to 2%, and a solubility parameter of 15 to 18, wherein the dichroic dye comprises a first dichroic dye represented by Chemical Formula 1 and having a molecular weight of about 600 Daltons to about 1,000 Daltons and a solubility parameter of less than or equal to 20.9:

Chemical Formula 1

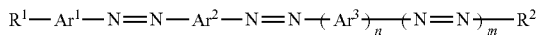

wherein, in Chemical Formula 1, $Ar^1$ to $Ar^3$ are each independently a substituted or unsubstituted phenylene group, $R^1$ is a substituted or unsubstituted C1 to C20 alkyl group, a substituted or unsubstituted C1 to C20 alkoxy group, a substituted or unsubstituted C1 to C20 alkylthio group, or a combination thereof, $R^2$ is hydrogen, a substituted or unsubstituted C1 to C20 alkyl group, a substituted or unsubstituted C6 to C20 aryl group, a C1 to C20 alkoxy group, a substituted or unsubstituted C1 to C20 alkylthio group, $-NR^3R^4$, or a combination thereof, wherein $R^3$ and $R^4$ are each independently hydrogen or a substituted or unsubstituted C1 to C10 alkyl group, and wherein $R^3$ and $R^4$ are optionally linked to each other to form a ring, and n is 0 or 1, and m is 0, wherein a solubility parameter difference between the polymer and the dichroic dye is less than 7.2, and wherein a color shift ($\Delta a^*b^*$) of the polarizing film is less than 2 upon standing at 85° C. for 250 hours, for a film thickness of 30 μm.

8. The polarizing film of claim 7, wherein $R^1$ in Chemical Formula 1 is a substituted or unsubstituted C4 to C20 alkyl group or a substituted or unsubstituted C4 to C20 alkoxy group, and $R^2$ in Chemical Formula 1 is hydrogen, a substituted or unsubstituted C1 to C20 alkyl group, $-NR^3R^4$, or a combination thereof, wherein $R^3$ and $R^4$ are each independently hydrogen or a substituted or unsubstituted C1 to C10 alkyl group, and wherein $R^3$ and $R^4$ are optionally linked to each other to form a ring.

9. The polarizing film of claim 7, wherein the first dichroic dye has a maximum absorption wavelength $\lambda_{max}$ of about 380 nanometers to about 490 nanometers.

10. The polarizing film of claim 7, wherein the dichroic dye further comprises a second dichroic dye having a maximum absorption wavelength $\lambda_{max}$ of greater than about 490 nanometers and less than or equal to about 580 nanometers, a third dichroic dye having a maximum absorption wavelength $\lambda_{max}$ of greater than about 580 nanometers and less than or equal to about 780 nanometers, or a combination thereof.

11. The polarizing film of claim 7, wherein the polymer comprises polyethylene, polypropylene, polyethylene terephthalate, polyethylene terephthalate glycol, polyethylene naphthalate, nylon, a copolymer thereof, or a combination thereof.

12. The polarizing film of claim 7, wherein the polarizing film is a melt-blend of the polymer and the dichroic dye, and an amount of the dichroic dye is about 0.01 to 5 parts by weight based on 100 parts by weight of the polymer.

13. A display device comprising:

a display panel and a polarizing film of claim 7 disposed on at least one side of the display panel.

14. The display device of claim 13, wherein the display panel is a liquid crystal panel or an organic light emitting panel.

* * * * *